US009985819B2

(12) United States Patent
Sanneck et al.

(10) Patent No.: US 9,985,819 B2
(45) Date of Patent: May 29, 2018

(54) COORDINATION IN SELF-ORGANIZING NETWORKS

(75) Inventors: Henning Sanneck, München (DE); Haitao Tang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 236 days.

(21) Appl. No.: 14/112,740

(22) PCT Filed: Apr. 21, 2011

(86) PCT No.: PCT/EP2011/056411
§ 371 (c)(1),
(2), (4) Date: Oct. 18, 2013

(87) PCT Pub. No.: WO2012/143055
PCT Pub. Date: Oct. 26, 2012

(65) Prior Publication Data
US 2014/0040450 A1  Feb. 6, 2014

(51) Int. Cl.
G06F 15/16  (2006.01)
H04L 12/24  (2006.01)
H04W 84/18  (2009.01)

(52) U.S. Cl.
CPC ............. H04L 41/04 (2013.01); H04W 84/18 (2013.01); *H04L 41/06* (2013.01)

(58) Field of Classification Search
CPC ......... H04L 41/04; H04L 41/06; H04W 84/18
See application file for complete search history.

(56) References Cited

U.S. PATENT DOCUMENTS

| 8,929,894 B2 * | 1/2015 | Catovic ................. H04W 36/30 370/216 |
| 2010/0008293 A1 * | 1/2010 | Gupta ................... H04W 92/20 370/328 |
| 2011/0004747 A1 * | 1/2011 | Venkatachalam ................. 713/2 |
| 2011/0105139 A1 * | 5/2011 | On ............................... 455/453 |
| 2012/0066377 A1 * | 3/2012 | Li et al. ....................... 709/224 |
| 2012/0108232 A1 * | 5/2012 | Viering et al. ............... 455/424 |
| 2012/0142356 A1 * | 6/2012 | Serravalle et al. ........... 455/436 |

FOREIGN PATENT DOCUMENTS

| WO | WO 2010/099832 A1 | 9/2010 |
| WO | 2011/005524 A2 | 1/2011 |
| WO | WO 2012/110078 A1 | 8/2012 |

OTHER PUBLICATIONS

Measurements, Architecture and Interfaces for Self-organising Networks, Neil Scully, Oct. 31, 2010, Version 1.0. Total p. 47.*

(Continued)

*Primary Examiner* — Aftab N. Khan
(74) *Attorney, Agent, or Firm* — Squire Patton Boggs (US) LLP (57) ABSTRACT

To decide, whether or not a SON function instance is allowed to execute, a priority, an impact time and an impact area for the SON function instance is determined, and priorities of other SON function instances scheduled to be run during the impact time of the requesting SON function instance and having an overlapping impact area are compared to the priority of the requesting SON function instance.

13 Claims, 3 Drawing Sheets

(56) References Cited

OTHER PUBLICATIONS

International Search Report and Written Opinion dated Dec. 22, 2011 corresponding to International Patent Application No. PCT/EP2011/056411.
Neil Scully et al., "Measurements, Architecture and Interfaces for Self-Organising Networks," Internet Citation, Oct. 31, 2010, pp. 1-47, XP002625808, Infso-ict-216284 Socrates, D5.10.
Sujuan Feng et al., "Self-Organizing Networks (SON) in 3GPP Long Term Evolution," Internet Citation, Nomor Research Newsletter, [Online] May 20, 2008, pp. 1-15, XP002526917.
Vodafone: "SON Philosophy for LTE," 3GPP TSG-SA5 (Telecom Management), Meeting SA5#54, Jun. 22, 2007, S5-071275, Orlando, Florida, XP050305927, 6 pages.
State Intellectual Property Office, P.R. China, Office Action for corresponding Chinese Appln. No. 201180070302.0, dated Jan. 29, 2016.

* cited by examiner

COORDINATION IN SELF-ORGANIZING NETWORKS

FIELD

The present invention relates to communication networks, and in particular, to self-organizing networks.

BACKGROUND ART

The evolvement of communication technology, especially the wireless communication technology, has increased the complexity of networks and the amount of network nodes, thereby increasing operation and maintenance tasks i.e. management tasks. To automate at least some of the tasks a concept called a self-organizing network (SON) is introduced by Next Generation Mobile Networks (NGMN) Alliance and 3GPP (Third Generation Partnership Project) to be used first in long term evolution (LTE) access networks, and later on in other networks, both in access and core networks. A self-organizing network is capable to self-configure and continuously self-optimize itself in response to network and traffic changes. In such a network, the network and/or a network node alters automatically, without human involvement, its configuration parameters, such as transmission and/or reception parameters, by means of different self-organizing network functions. Since monitored network behavior triggers execution of one or more self-organizing functions, it may happen that several independent self-organizing functions are active concurrently in the same network area with different targets. Thus, there is a need to coordinate the self-organizing network functions. One challenge for the coordination is that a "plug and play" network nodes supporting self-organizing network functionality can be bought from any vendor, and instead of buying single network nodes, a communication service provider may buy vendor-specific domains, and/or organize network nodes bought from different vendors to different vendor-specific domains, each covering a geographical area and not knowing run-time situation of other domains.

SUMMARY

An object of the present invention is to provide a mechanism to self-organizing network function coordination. The object of the invention is achieved by methods, an apparatus, a system and a computer program product which are characterized by what is stated in the independent claims. The preferred embodiments of the invention are disclosed in the dependent claims.

An aspect provides self-organizing network functions with priorities, impact areas and impact time by means of which it may be evaluated in a domain whether or not to lock out one or more other self-organizing functions in the domain or in a neighboring domain while one self-organizing function is allowed to run in the domain. An advantage of the aspect is that checking the priority, the impact area, and impact time, instead of checking parameter values of self-organizing network functions, requires less processing capacity, less information exchange and is faster and yet provides an improved conflict avoiding/coordination mechanism.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any communication system or any combination of different communication systems and corresponding networks and network nodes that support self-organizing network functionality. The communication system may be a wireless communication system or a communication system utilizing both fixed networks and wireless networks or a fixed communication system. The specifications of communication systems and networks, especially in wireless communication, develop rapidly. Such development may require extra changes to an embodiment. Therefore, all words and expressions should be interpreted broadly and they are intended to illustrate, not to restrict, the embodiment.

Figure 1:
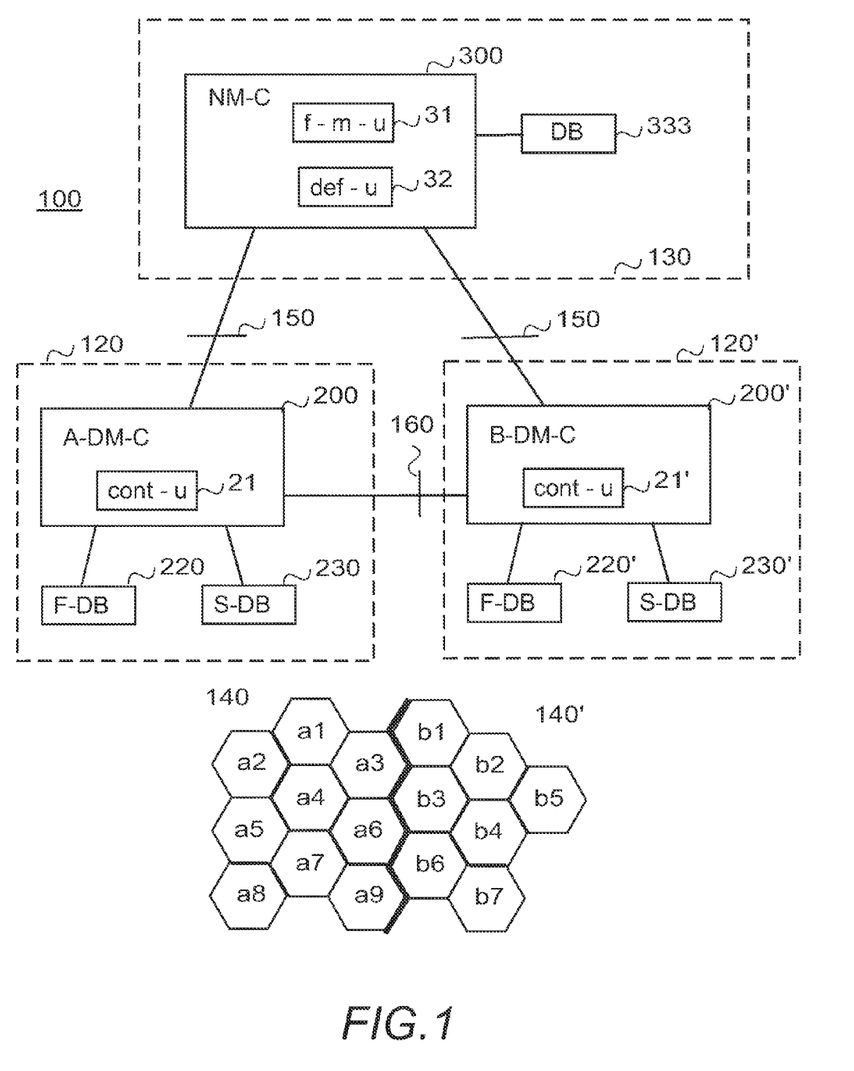
FIG. 1 shows simplified architecture of an exemplary system having schematic block diagrams of exemplary apparatuses.

Below an acronym SON is used to mean self-organizing network. A general architecture of a communication system 100 providing self-organizing network functionality is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures including SON functions that are not illustrated. Further, It should be appreciated that the actual functions and measurements used in self-optimization, self-configuration and self-healing, structures, elements and the protocols used in or for information exchange, including control information, and topology information, and in or for database/domain/network management, are irrelevant to the actual invention. Therefore, they need not to be discussed in more detail here.

The illustrated parts of the communication system 100 in FIG. 1 are a network management subsystem 130, two vendor-specific domain management subsystems 120, 120', and corresponding vendor-specific radio access networks 140, 140' supporting SON functionality, each radio access network forming a vendor-specific domain.

It bears no significance to embodiments how SON functions are allocated (i.e. distributed, centralized and hybrid/multi-layer manner may be used) and the allocation may differ from a vendor-specific domain to a vendor-specific domain. Further, embodiments are implementable regardless of where the SON functions are implemented (at network element level, at vendor-specific domain manager level, and/or at vendor-specific network management level). It is anticipated that there will be a number of different SON functions available for automatically perform management actions, such as fault, configuration, accounting, performance and security management. Examples of SON functions include mobility load balancing, handover optimization, coverage and capacity optimization, cell outage management, and mobility robustness optimization. Most SON functions are vendor- and/or release-specific.

In the illustrated example, the network management system comprises a network level coordinator 300 (NM-C). The network level coordinator may locate in an operations, administration and maintenance (OA&M) system and, more specifically, be part of the network management functionality in an operation support system. The network level coordinator 300 is a computing device that may be any apparatus or device or equipment or network node configured to perform one or more of a network level coordinator functionalities described with an embodiment, and it may be configured to perform functionalities from different embodiments. For this purpose, the network level coordinator 300 may comprise a SON function managing unit (f-m-u) 31 for deciding whether or not to authorize a SON function to run and for setting locks. The network node may, in addition to or alternatively, comprise a defining unit (def-u) 32 for defining priorities for different logical SON functions. In some embodiments, ways to calculate/determine impact areas and/or impact times may also be defined to the logical SON functions by means of the defining unit 32. An advantage provided by the defining unit is that there is no need to standardize the priorities for the SON functions. Further, allowing the network operator to define the priorities, facilitates differentiation between network operators (different operational goals may lead to different priority settings). The SON function managing unit and/or the defining unit may be separate units or integrated to another unit in the network node. In other embodiments, the SON function managing unit 31, or part of its functionality, may locate in another network node than the defining unit 32, or part of its functionality. In a still further embodiment there is neither the SON function managing unit 31 nor the defining unit 32. The functionalities of the SON function managing unit 31 and/or the defining unit 32 are described in more detail below.

The network management system further comprises a network node or a logical entity 333 having a database whereto in the illustrated example at least logical SON functions with corresponding priorities are stored by the defining unit 32 to allow the communication service provider to control, by means of the logical SON functions, all SON functions although most SON functions are vendor- and/or release-specific interpreted and implemented differently by different vendors' network nodes. By means of the logical SON functions, the communication service provider can have in the database information and definitions of SON functions and associated priorities in a form that is vendor-independent, release-independent and interpretation-independent. The mapping between a logical SON function and its vendor/release/interpretation-specific SON function(s) is then performed in the vendor-specific domain. The database may further comprise topology information on radio access networks. The database may be of any type, have any possible storage structure and being managed by any database management system. It should be appreciated that the content in a corresponding database depends on implementation details and information needed. It should be appreciated that the database may contain instead of logical SON functions, vendor-specific SON functions with corresponding priorities. An advantage provided by the logical SON functions is that the communication service provider is thus free from vendor-specific details, does not need to map vendor-specific SON functions to each other to ensure that the priorities are the same through different domains, and can thus focus on vendor-independent operations. However, it should be appreciated, that instead of having, or in addition to, the logical entity 333 in the network management system, the logical entity 333 may be distributed/decentralized to domain management systems.

In the illustrated example, each domain management system 120, 120' comprises a domain level coordinator (DM-C) 200, 200', one for vendor A domain and one for vendor B domain, connected over a standardized interface Itf-N 150 to the network level coordinator 300, and over a peer-to-peer interface 160, such as Itf-P2P, to a domain level coordinator in another domain. It should be appreciated that in another example no peer-to-peer interface exists, or it exists only between some domain level coordinators, for example if they are from the same vendor. The peer-to-peer interface may be defined by the network operator, or by the vendors, or be a standardized interface. The domain level coordinator 200, 200' may locate in OA&M system. The domain level coordinator 200, 200' is a computing device that may be any apparatus or device or equipment configured to perform one or more of a domain level coordinator (i.e. vendor-specific coordinator) functionalities described with an embodiment, and it may be configured to perform functionalities from different embodiments. For this purpose, the network node comprises a SON function controlling unit (cont-u) 21, 21' for obtaining information from a database and for using the information to decide how to handle a request, as will be described in more detail below. In the illustrated example, each domain management system 120, 120' comprises a network node or a logical entity 220, 220' having a database (F-DB) for storing domain-specific SON function information on the domain in question. The SON function information comprises for each SON function at least a corresponding priority (deduced based on the logical SON function with which the actual SON function maps to). In addition to that it may comprise information on how to determine an impact area and/or information for an impact time.

Herein, the impact area means a scope/affected zone in which an action of a SON function instance would have its effect. The scope/affected zone may be given as a rather exact definition, like a cell, a cell pair, a cell with its neighbor cells, a cell cluster, a sub-network, or the network, or by an algorithm for defining the impact area, for example. Herein, the impact time means a sum of information on how long it takes to execute the SON function and how long extra time it will take until the changes caused by the execution are visible to other SON functions. The impact time may be given by means of one numerical time value, or by means of different "time slices" like "input time", "triggering time", "execution time", and "result time", and/or by means of unambiguous generalizations, like "short" (in seconds), "medium" (in minutes) and "long" (over hours). Further, a SON function may have more than one impact time: For example, there may be for a specific (other) SON function impact time 1, and for all other SON functions impact time 2, or for each other SON function a function-specific impact time, or any combination between one impact time and function-specific impact times for each other SON function. It should be appreciated that it bears no significance how the impact area and the impact time are determined, and/or whether or not they are stored before-hand, it suffices that they are determined at some point. Naturally the database F-DB may comprise other parameters, algorithms, etc.

Further, in the illustrated example, each domain management system 120, 120' comprises another network node or a logical entity 230, 230' having a database (S-DB) for storing scheduling information on SON function instances. The scheduling information contains information on scheduled SON function instances with corresponding impact areas, and when to lock and unlock them.

Both of the databases may be of any type (different from each other), have any possible storage structure and being managed by any database management system. Although not illustrated, each domain may comprise a database storing domain-specific topology information and/or information on cells. It should be appreciated that the content in a corresponding database depends on implementation details and configuration of a corresponding domain level coordinator, as will be explained below. Further, it should be appreciated that it bears no significance where the databases, or part of a database, locate, and whether or not the databases, or some of them, are integrated together.

The radio access network 140 has been illustrated by cells a1 to a9, and the radio access network 140' by cells b1 to b7. It should be appreciated that the network level coordinator and/or the domain level coordinators may be in one network node or distributed to two or more network nodes.

The units illustrated in FIG. 1 may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

A network node, or a corresponding apparatus, or corresponding network equipment implementing functionality or some functionality according to an embodiment may generally include a processor (not shown in FIG. 1), controller, control unit, micro-controller, or the like connected to a memory and to various interfaces of the apparatus. Generally the processor is a central processing unit, but the processor may be an additional operation processor. The deciding unit, and/or the negotiating unit, and/or the conflict detecting unit, and/or the directing unit may be configured as a computer or a processor, or a microprocessor, such as a single-chip computer element, or as a chipset, including at least a memory for providing storage area used for arithmetic operation and an operation processor for executing the arithmetic operation. The SON function managing unit and/or the defining unit and/or the SON function controlling unit may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, the SON function managing unit and/or the defining unit and/or the SON function controlling unit may be an element that comprises one or more arithmetic logic units, a number of special registers and control circuits. Further, the network node, or the corresponding apparatus, or network equipment may comprise other units, for example, the domain level coordinator may comprise the defining unit 32, and the network node, or the corresponding apparatus, or network equipment comprises different interface units, such as a receiving unit (not illustrated in FIG. 1) for receiving different inputs, control information, requests and responses, for example, and a sending unit (not illustrated in FIG. 1) for sending different outputs, control information, responses and requests, for example. The receiving unit and the transmitting unit each provides an interface in an apparatus (network node), the interface including a transmitter and/or a receiver or a corresponding means for receiving and/or transmitting information, and performing necessary functions so that content, control information, etc. can be received and/or transmitted. The receiving and sending units may comprise a set of antennas, the number of which is not limited to any particular number.

The network node, or a corresponding apparatus, or network equipment may generally include volatile and/or non-volatile memory (not illustrated in FIG. 1), for example EEPROM, ROM, PROM, RAM, DRAM, SRAM, double floating-gate field effect transistor, firmware, programmable logic, etc. and typically store content, data, or the like. The memory may also store computer program code such as software applications (for example, for the SON function managing unit and/or the defining unit and/or the SON function controlling unit) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/network node or external to the processor/network node in which case it can be communicatively coupled to the processor/network node via various means as is known in the art. An example of an external memory includes a removable memory detachably connected to the apparatus.

It should be appreciated that the network nodes, or corresponding apparatuses, or network equipment may comprise other units used in or for information transmission, in or for network/domain management systems, and/or for database management systems, which store database contents, allowing data creation and maintenance, and search and other access obtaining data from the database unit. However, the invention poses no specific requirements for them and, therefore, they need not to be discussed in more detail here.

Figure 2:
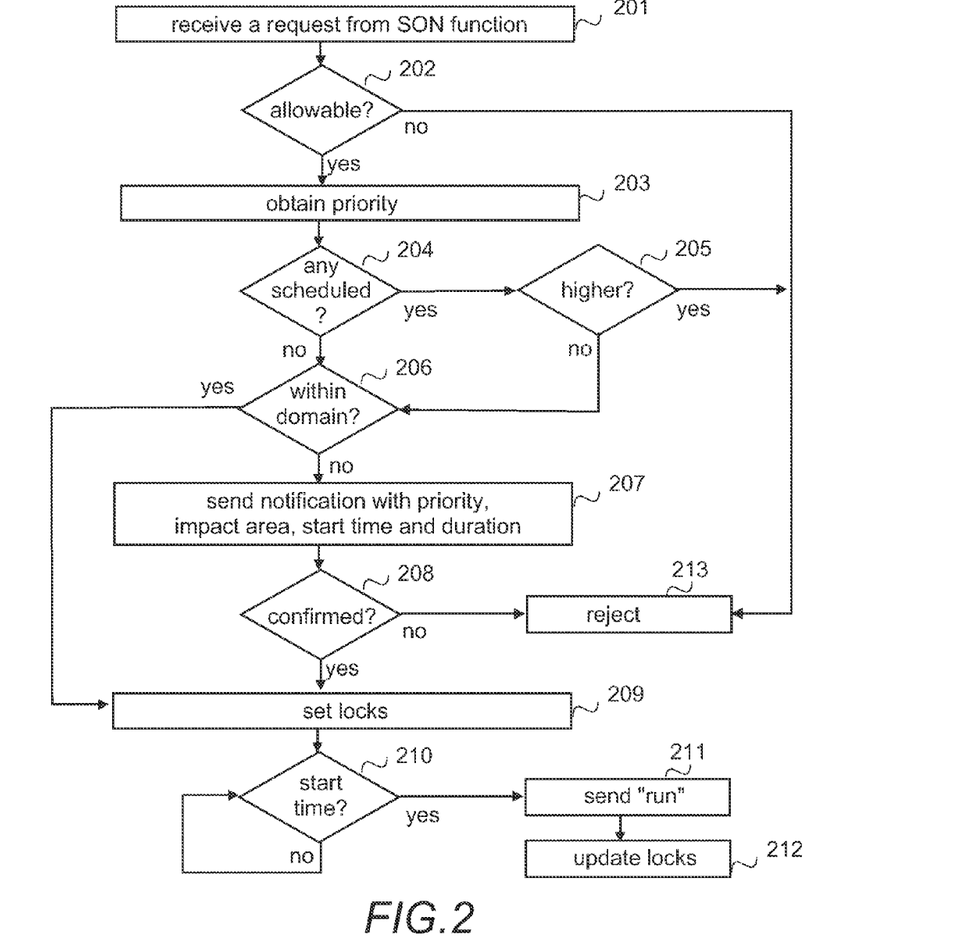
FIGS. 2 to 5 are flow charts illustrating exemplary functionalities of apparatuses.

FIG. 2 is a flow chart illustrating an exemplary functionality of the domain level coordinator, or more precisely the SON function controlling unit, when a SON function under its control wants to change some configuration.

Referring to FIG. 2, the domain level coordinator receives, in step 201, an authorization request from a SON function instance, the authorization request requesting permission to execute a corresponding SON function X. The request contains some identifying information on the SON function X, information on impact area or information based on which the impact area may be determined. For example, the information on impact area may be given as a cell list comprising one or more of the cells, and the cells in the other domain may be listed as cells or by indicating the domain. An example of information based on which the impact area may be determined, includes that a cell in which the SON function instance want to execute the SON function X is given with the above described rather exact information. The request may also contain the impact time (or impact times) or the impact time(s) may be stored to the database with other information of the SON function X. Below it is assumed, for the sake of clarity, that the SON function X has only one impact time.

In response to receiving the request, the domain level coordinator checks, in point 202, whether or not the indicated change/parameter values are allowable, using parameter values, policies etc. How this checking is performed, is irrelevant: it may be performed according to already known procedures, or using future procedures. If the request is allowable, the domain level coordinator obtains, in step 203, the priority of the SON function X using the identifying information and then checks, in step 204, using the received/determined impact time whether or not there are any scheduled SON function instances to be started during the impact time. If there is one or more scheduled SON function instances, the domain level coordinator compares, in step 205, the priorities. If the priority of the SON function X is higher than the priority of the scheduled SON function (or priorities of scheduled SON functions), the domain level coordinator then assess, in step 206, whether the impact area is within the domain or extends to a neighboring domain. For the assessment, the domain level coordinator may use cell-specific information, like cell lists indicating boarder cell or other indication that an adjacent cell is in another domain, for example. More advanced methods, like semantic models, may also be used.

If the neighboring domain is involved (step 206), a notification containing the priority of the SON function X, the impact area, a starting time and a duration is formed/mapped to be according to a common notion, and send, in step 207. The starting time may be an estimation, or some specific time after the authorization request is received (in step 201), or the authorization request may contain a required starting time, which may then be used. Depending on embodiment, the notification is sent either over the peer-to-peer interface directly to the other domain level coordinator, or via the network level coordinator (or corresponding element simply forwarding the request and related response, the simply forwarding including configurations of the message format, for example from a notification to an operation, and vice versa) over the Itf-N interface to the other domain level coordinator, or to the network level coordinator for decision. In a still further embodiment, the domain level coordinator may be configured to send the notification directly to the other domain level coordinator, if they are of the same vendor, otherwise via the network level coordinator, or to the network level coordinator (depending how the decision mechanism is implemented).

When an operation containing a response is received, it is checked, in step 208, whether the response confirmed that the SON function may be executed. If it contained a confirmation, the domain level coordinator sets, in step 209, locks in its scheduling database to lock out other SON functions within the impact area, i.e. in one or more cells, for a certain time determined by means of the impact time, and possibly updates, in step 209, scheduled SON function instances to be executed after the impact time has lapsed. (Herein locking means blocking each non-requesting "timely and regionally overlapping" SON function for specific cell(s) for a predetermined period or blocking the specific cell(s) for other SON functions.) Further, if the received operation contained additional information, such as an instruction to reduce the impact time, this information is also updated, in step 209, to the scheduling information.

Then the domain level coordinator monitors the time, and when it is time to start (step 210), the SON function is authorized to execute (nm) by sending, in step 210, an authorization.

Then, when the impact time has passed, the locks are updated in step 212, i.e. the domain level coordinator removes corresponding locking(s).

If the request is not allowable (step 202), or the scheduled SON function (or at least one of the functions) has a higher priority (step 205), or instead of confirmation a rejection was received (step 208), the request is rejected, in step 213, in the illustrated embodiment.

In another embodiment, if the other domain level coordinator in the neighboring domain sends the operation not allowing the SON function X to be executed, the network node may decide to ignore the response and triggers execution of SON function X. In other words, instead of step 213, steps 210-212 are performed.

Figure 3:
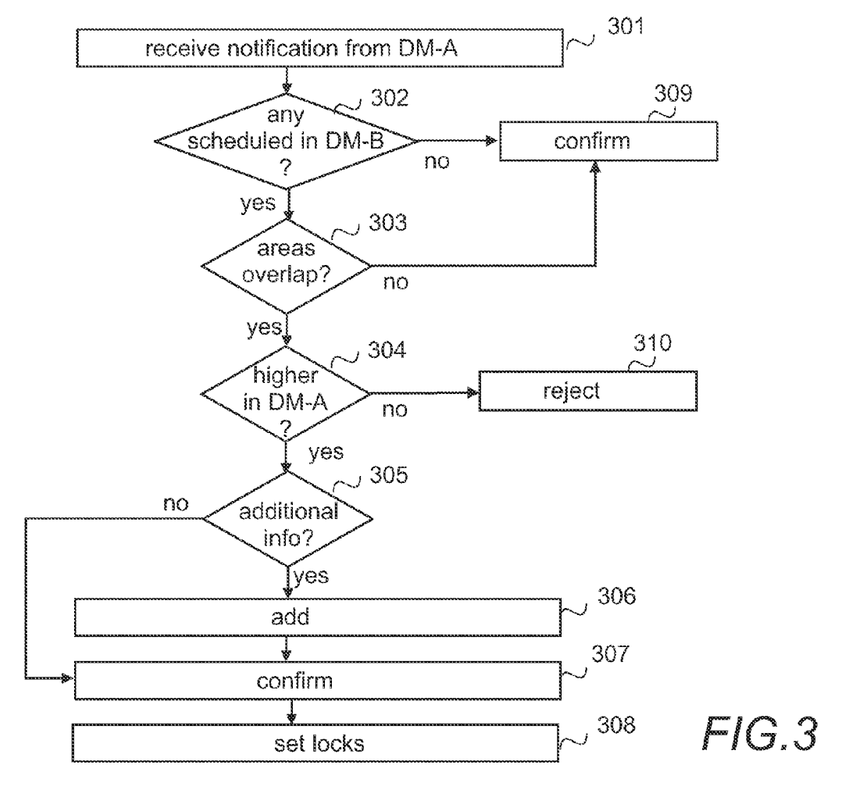

FIG. 3 is a flow chart illustrating an exemplary functionality of the deciding unit in response to receiving the notification sent in step 207 of FIG. 2 by the domain A for decision. Depending on implementation, the deciding unit is either the other domain level coordinator in domain B, or more precisely the SON function controlling unit, or the network level coordinator, or more precisely, the SON function managing unit.

Referring to FIG. 3, when the notification comprising the priority, starting time, duration and impact area, is received in step 301 from the domain-level coordinator in the domain A, it is checked, in step 302, using the received/determined impact time whether or not there are any scheduled SON function instances to be started during the impact time in the domain B. If the network level coordinator is the deciding entity, this checking comprises sending a request to the domain level coordinator in the domain B and receiving a response to the request from the domain level coordinator in the domain B, the response providing needed information (as will be described with FIG. 4). If the domain level coordinator in the domain B is the deciding entity, this checking is performed by the domain level coordinator as with step 204 in FIG. 2.

If there is one or more scheduled SON function instances in the domain B, it is assessed, in step 303, for each scheduled SON function instance; whether the impact area received in the notification in step 301 overlaps with the impact area of the scheduled SON function instance. If there is at least one scheduled SON function instance in the domain B having such an overlapping impact area, it is assessed, in step 304, for each such scheduled SON function instance, whether the priority received in the notification in step 301 is higher than the priority of the scheduled SON function. If the received priority is higher than the priority of the scheduled SON function (or each of the priorities of the scheduled SON functions), in the example it is assessed, in step 305, whether additional information, such as an instruction to reduce the duration (thereby reducing the impact time) and/or either advance or postpone the starting time, is to be provided to minimize the amount of scheduled SON function instances found in step 302 or to avoid locking of some scheduled SON function intances. If the additional information is to be provided, it is added, in step 306, to an operation comprising confirmation which is then sent, in step 307, to the domain level coordinator in the domain. The adding step 306 is skipped over, if there is no additional information, i.e. the process then proceeds from step 305 to step 307. Then the locks in the domain B are set, in step 308, to lock out other SON functions in the domain B. If the deciding unit is the network level coordinator, setting the locks is performed by sending locking information to the domain level coordinator in domain B, which then performs the functionality described with FIG. 5. If the deciding unit is the domain level coordinator, it sets the locks in a similar way as they were set in step 209 of FIG. 2, and further performs possible updates to scheduled SON functions in the domain B and unlocking.

Thus, cross-border cooperation is achieved with SON function locking being performed in both domains.

If there is no scheduled SON function instance (step 302) or no scheduled SON function instances with an overlapping impact area (step 303), an operation comprising confirmation is sent, in step 309, to the domain level coordinator in the domain A.

Figure 4:
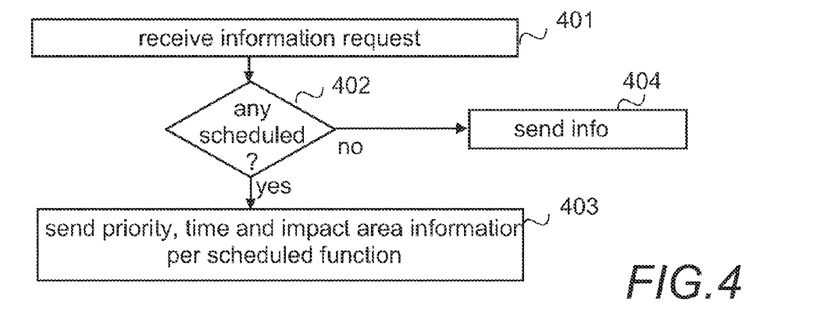
Figure 5:
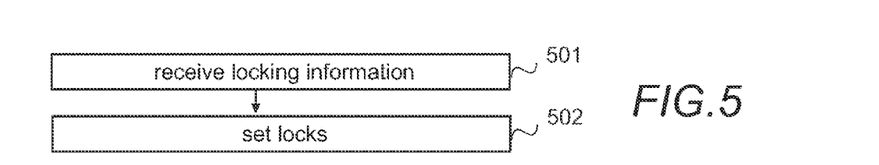

If there is a scheduled SON function instance with overlapping impact area and higher priority (step 304), an operation rejecting (i.e. not comprising confirmation) is sent in step 310 to the domain level coordinator in the domain A. As said above, FIGS. 4 and 5 are flow charts illustrating an exemplary functionality of the domain level coordinator, or more precisely the SON function controlling unit, in domain B when the network level coordinator, or more precisely, the SON function managing unit, is the deciding unit. FIG. 4 describes what happens during step 302 of FIG. 3 in the domain level coordinator when it is not the deciding entity, and FIG. 5 what happens in response to the network level coordinator setting the locks in step 308 of FIG. 3. Referring to FIG. 4, the domain level coordinator receives, in step 401, an information request from the network level coordinator, the information request indicating an impact time and requesting information on SON function instances that are scheduled to be run during the impact time. The impact time is preferably given as a starting time and duration. In response to receiving the request, the domain level coordinator checks, in step 402, using the received impact time whether or not there are any scheduled SON function instances to be started during the impact time. If there is, the domain level coordinator sends, in step 403, for each scheduled SON function its priority, scheduling information, like start time and duration, and impact area information to the network level coordinator.

If there are no scheduled SON function instances to be started during the impact time, corresponding information is sent, in step 404, to the network level coordinator. Referring to FIG. 5, the domain level coordinator receives, in step 501, from the network level coordinator locking information that commands to set the locks on for certain area (for example, for certain cells) for a certain period of time at least for certain scheduled SON functions. In response to the received command, the locks are set on, in step 502, for the certain period of time. If the locking information contains updates to scheduled SON functions, the updating is performed also in step 502.

Thus, the outcome is that in both domains, the overlapping cells/SON functions are locked for others during the requested time interval, thereby protecting the changes induced by the requesting SON function instance from interfering changes by other SON function instances.

Although in the above examples the same impact time was used, it should be appreciated that finding out scheduled SON functions (i.e. performing step 204, step 302 or step 402) may be performed impact time-specifically and SON function specifically. For example, the longest impact time may be taken first, and if there are scheduled SON functions during the longest impact time, for each found SON function it is checked whether or not it is scheduled to be run during the impact time indicated for this specific type of SON function. Another example is to take SON function-impact time-pairs and use them to find out scheduled SON functions.

Although in the above it has been assumed, for the sake of clarity, that there are no locks locking at least part of the impact area of the requesting SON function during the intended impact time, it should be appreciated that a check corresponding to the check relating to steps 204, 302 and 402 (i.e. "any scheduled to run?") may be made for the locks, or the check relating to steps 204, 302 and 402 may be "locked or any scheduled to run?". Depending on an embodiment and/or implementation, the locks may be "ignored" if a certain criteria is fulfilled, like a requesting SON function instance having a higher priority, or the locks may be respected (i.e. if something is lock, it remains locked) regardless of the priority.

In case there is a SON function instance running with an overlapping impact area and impact time while the processes described above is processed, it depends on the policies how the situation is solved. One policy may be that a running SON function instance is not interrupted (regardless of the priorities) and the requesting SON function instance waits. Another policy is that a running SON function instance having a lower priority is halted or cancelled if the requesting SON function instance has a higher priority.

In an embodiment in which the impact time of a SON function instance is given so that the process can detect when the execution/running time has ended and the extra time (for the change(s) to be visible to others) starts and ends, further checks may be involved in case there is a lock on locking at least part of the impact area of the requesting SON function instance during the intended impact time (i.e. there is a SON function instance with the overlapping impact area and impact time). If further checks are involved, they may include checking whether the overlapping time keeping the lock on is the extra time (i.e. the locking SON function instance has already been executed), and if yes, the priorities are checked and a requesting SON function instance having a higher priority is allowed to run, i.e. the locking is ignored in the case.

In further embodiments, if at least part of the impact area is locked during the intended impact time, the requesting SON function may be rescheduled or rejected.

If the priorities of the requesting SON function instance and the running/scheduled SON function instance are the same, it again depends on the policy. The policy may be "the one coming first is first served", first coming meaning either earlier starting time or earlier requesting time. Another option is to trigger a parameter value evaluation to determine whether it is possible to allow them run in parallel.

Although in the above, the priority check is performed regardless of the SON function type, it should be appreciated that the decision procedure may be enhanced to contain for some specific SON functions, like coverage and capacity optimization (CCO) functions, a parameter value check. The specific SON functions may be associated with an indication indicating that a decision procedure based on checking parameter values of corresponding SON function instances is to be used with the function. Depending on the implementation, the decision procedure based on checking parameter values of corresponding SON function instances may be performed either in addition to, or instead of, the above described priority based process.

Since the number of different parameters changed by SON functions is far bigger than the number of SON functions, it is evident that with the above described procedure in which parameters are not used in the decision procedure, or are used only in specific cases that do not happen very often, amount of mapping, comparison/checking and sent values may be minimized compared to the decision procedure based on checking parameter values, thereby minimizing the processing load and transmission load and yet to obtain a stable enough network optimization.

The steps and related functions described above in FIGS. 2 to 5 are in no absolute chronological order, and some of the steps may be performed simultaneously or in an order differing from the given one. For example, only after the locks are successfully set in the domain B (step 308 in FIG. 3), a confirmation to the domain A is sent (step 307 in FIG. 3). Other functions can also be executed between the steps or within the steps. For example, if the scheduling information is updated, or a SON function instance is rescheduled/blocked, corresponding information may be forwarded to the SON function instance in question. Some of the steps/points or part of the steps/points can also be left out or replaced by a corresponding step/point or part of the step/point. For example, instead of the domain level coordinator monitoring the time (step 210 in FIG. 2), the authorization to run may be immediately sent to the SON function instance. The messages (notifications, requests, etc.) are only exemplary and may even comprise several separate messages for transmitting the same information. In addition, the messages may also contain other information.

Although in the above the embodiments have been described assuming that vendor domains are radio access networks, it is apparent to a person skilled in the art how to implement the embodiments to vendor domains providing core networks. The embodiments may also be implemented to "plug and play" management system entities.

As is evident from the above, the terms "request", "response", "notification" and "operation" used herein, do not imply that a server-client or a master-slave approach is or needs to be used. The terms are used as general terms to represent asking, answering and instructing without restricting the embodiments to a particular way of various ways to implement the asking-answering-instructing mechanism.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   determining at a self-organizing network function coordination apparatus, in response to a first self-organizing network function instance requesting a permission to execute a corresponding self-organizing network function, a priority of the first self-organizing network function instance, an impact time of the first self-organizing network function instance, and an impact area of the first self-organizing network function instance, wherein the impact time is based on how long it takes to execute the first self-organizing network function instance;
   checking at the self-organizing network function coordination apparatus, whether or not there are one or more other self-organizing network functions scheduled to be run during the impact time of the first self-organizing network function instance, and having an overlapping impact area with the impact area of the first self-organizing network function;
   when it is determined that there are the one or more other self-organizing network functions, the method further comprises:
   comparing at the self-organizing network function coordination apparatus priorities of the one or more other self-organizing network function instances scheduled to be run during the impact time of the first self-organizing network function instance and having an overlapping impact area with the impact area of the first self-organizing network function; and
   when the priority of the first self-organizing network function instance is higher than other priorities of the one or more other self-organizing network function instances, the method further comprises:
   allowing at the self-organizing network function coordination apparatus the first self-organizing network function instance to execute the corresponding self-organizing network function; and
   locking at the self-organizing network function coordination apparatus the other self-organizing network function instances.

2. The method as claimed in claim 1, further comprising:
   detecting that at least part of the impact area of the first function belongs to another domain;
   sending a notification containing priority, impact area, and impact time information to the other domain or to a network management system.

3. The method as claimed in claim 2, further comprising:
   receiving a response to the notification; and
   when the response to the notification indicates that execution of the first self-organizing network function instance is allowed, performing the allowing and locking.

4. A method comprising:
   receiving at a self-organizing network function coordination apparatus priority of a first self-organizing network function instance, impact area of the first self-organizing network function instance, and impact time information of the first self-organizing network function instance in a first domain, wherein the impact time is based on how long it takes to execute the first self-organizing network function instance;
   detecting at the self-organizing network function coordination apparatus that at least part of the impact area of the first function belongs to a second domain;
   comparing at the self-organizing network function coordination apparatus priorities of self-organizing network function instances scheduled to run in the second domain during the impact time of the first self-organizing network function instance and having an overlapping impact area with the impact area of the first self-organizing network function in the second domain;
   when the priority of the first self-organizing network function instance is higher than other priorities of one or more other self-organizing network function instances, the method further comprises:
   sending by the self-organizing network function coordination apparatus an indication allowing the first self-organizing network function instance to execute the corresponding self-organizing network function in the first domain; and
   locking at the self-organizing network function coordination apparatus the second domain the one or more other self-organizing network function instances having an overlapping impact area.

5. The method as claimed in claim 4, further comprising:
requesting, in response to the detecting, from the second domain information on self-organizing network function instances scheduled to run in the second domain during the impact time of the first self-organizing network function instance;
receiving information on a priority, impact area, and impact time of each self-organizing network function instances scheduled to run in the second domain during the impact time of the first self-organizing network function instance;
using the information when performing the comparison; and
performing the locking by sending locking instructions to the second domain.

6. The method as claimed in claim 1, further comprising:
detecting that at least one of the other priorities is higher than the priority of the first self-organizing network function instance; and
instructing the first self-organizing network function not to execute the corresponding self-organizing network function.

7. The method as claimed in claim 1, wherein the impact time is determined by a starting time and duration, or the impact area is determined by a cell list.

8. The method as claimed in claim 1, wherein the impact time comprises information from which starting and ending times of an extra time can be deduced, the extra time being needed for outcome of an executed self-organizing network function to be visible to other self-organizing network function instances, and wherein the method further comprises:
detecting, during the checking, a second self-organizing network function instance with an overlapping impact area and impact time locking at least part of the impact area of the first self-organizing network function instance during the intended impact time of the first self-organizing network function instance;
checking whether the overlapping time of the second self-organizing network function instance is within the extra time;
when the overlapping time of the second self-organizing network function instance is within the extra time, the method further comprises:
comparing the priorities of the first and second self-organizing network function instances, and
when the priority of the first self-organizing network function instance is higher allowing the first self-organizing network function instance to execute the corresponding self-organizing network function.

9. A computer program product comprising computer code embodied on a non-transitory computer readable medium, the computer code, when run on a computer, controlling the computer to perform the steps of:
determining, in response to a first self-organizing network function instance requesting a permission to execute a corresponding self-organizing network function, a priority of the first self-organizing network function instance, an impact time of the first self-organizing network function instance, and an impact area of the first self-organizing network function instance, wherein the impact time is based on how long it takes to execute the first self-organizing network function instance;
checking, whether or not there are one or more other self-organizing network functions scheduled to be run during the impact time of the first self-organizing network function instance and having an overlapping impact area with the impact area of the first self-organizing network function;
when it is determined that there are the one or more other self-organizing network functions, the method further comprises:
comparing priorities of other self-organizing network function instances scheduled to be run during the impact time of the first self-organizing network function instance and having an overlapping impact area with the impact area of the first self-organizing network function; and
when the priority of the first self-organizing network function instance is higher than other priorities of the one or more other self-organizing network function instances, the method further comprises:
allowing the first self-organizing network function instance to execute the corresponding self-organizing network function; and
locking the other one or more self-organizing network function instances.

10. An apparatus, comprising:
at least one memory connected to a processor, said memory containing computer code, the at least one memory and the computer program code are configured to, with the processor, cause the apparatus to:
determine, in response to a first self-organizing network function instance requesting a permission to execute a corresponding self-organizing network function, a priority of the first self-organizing network function instance, an impact time of the first self-organizing network function instance, and an impact area of the first self-organizing network function instance, wherein the impact time is based on how long it takes to execute the first self-organizing network function instance;
check, whether or not there are one or more other self-organizing network functions scheduled to be run during the impact time of the first self-organizing network function instance and having an overlapping impact area with the impact area of the first self-organizing network function;
when it is determined that there are the one or more other self-organizing network functions, the apparatus is configured to:
compare priorities of the other one or more self-organizing network function instances scheduled to be run during the impact time of the first self-organizing network function instance and having an overlapping impact area with the impact area of the first self-organizing network function; and
when the priority of the first self-organizing network function instance is higher than other priorities of the one or more other self-organizing network function instances, the apparatus is configured to:
allow the first self-organizing network function instance to execute the corresponding self-organizing network function; and
lock the other one or more self-organizing network function instances.

11. A system, comprising:
a network management system comprising an apparatus, the apparatus comprising:
at least one memory comprising computer program code;
at least one processor;
wherein the at least one memory and the computer program code are configured, with the at least one processor, to cause the apparatus at least to:

receive priority of a first self-organizing network function instance, impact area of the first self-organizing network function instance, and impact time information of the first self-organizing network function instance in a first domain wherein the impact time is based on how long it takes to execute the first self-organizing network function instance, detect that at least part of the impact area of the first function belongs to a second domain, compare priorities of self-organizing network function instances scheduled to run in the second domain during the impact time of the first self-organizing network function instance and having an overlapping impact area with the impact area of the first self-organizing network function in the second domain, when the priority of the first self-organizing network function instance is higher than the other priorities, sending an indication allowing the first self-organizing network function instance to execute the corresponding self-organizing network function in the first domain, when the priority of the first self-organizing network function instance is higher than the other priorities, locking in the second domain the other self-organizing network function instances having an overlapping impact area, requesting, in response to the detecting, from the second domain information on self-organizing network function instances scheduled to run in the second domain during the impact time of the first self-organizing network function instance, receive information on a priority, impact area, and impact time of each self-organizing network function instances scheduled to run in the second domain during the impact time of the first self-organizing network function instance, and perform the locking by sending locking instructions to the second domain;

two domain management systems, each comprising an apparatus configured to:

determine, in response to a first self-organizing network function instance requesting a permission to execute a corresponding self-organizing network function, a priority, an impact time, and an impact area for of the first self-organizing network function instance, wherein the impact time is based on how long it takes to execute the first self-organizing network function instance;

check, whether or not there are one or more other self-organizing network functions scheduled to be run during the impact time of the first self-organizing network function instance and having an overlapping impact area with the impact area of the first self-organizing network function;

when it is determined that there are the one or more other self-organizing network functions, the apparatus is configured to:

compare priorities of the one or more other self-organizing network function instances scheduled to be run during the impact time of the first self-organizing network function instance and having an overlapping impact area with the impact area of the first self-organizing network function; and when the priority of the first self-organizing network function instance is higher than other priorities of the one or more other self-organizing network function instances, the apparatus is configured to:

allow the first self-organizing network function instance to execute the corresponding self-organizing network function; and lock the other one or more self-organizing network function instances; and a network configured to support self-organizing network functionality in which a self-organizing network function instance is configured to request a permission to execute a corresponding self-organizing network function, wherein the network management system is configured to exchange information with a domain management system over an interface between the systems.

12. A system comprising at least:

two domain management systems, each comprising an apparatus configured to:

determine, in response to a first self-organizing network function instance requesting a permission to execute a corresponding self-organizing network function, a priority of the first self-organizing network function instance, an impact time of the first self-organizing network function instance, and an impact area of the first self-organizing network function instance, wherein the impact time is based on how long it takes to execute the first self-organizing network function instance;

check, whether or not there are one or more other self-organizing network functions scheduled to be run during the impact time of the first self-organizing network function instance and having an overlapping impact area with the impact area of the first self-organizing network function;

when it is determined that there are the one or more other self-organizing network functions, the apparatus is configured to:

compare priorities of the one or more other self-organizing network function instances scheduled to be run during the impact time of the first self-organizing network function instance and having an overlapping impact area with the impact area of the first self-organizing network function; and when the priority of the first self-organizing network function instance is higher than other priorities of the one or more other self-organizing network function instances, the apparatus is configured to:

allow the first self-organizing network function instance to execute the corresponding self-organizing network function; and lock the one or more other self-organizing network function instances; and a network configured to support self-organizing network functionality in which a self-organizing network function instance is configured to request a permission to execute a corresponding self-organizing network function, wherein the domain management systems are configured to exchange information with each other over an interface between the domain management systems.

13. The system as claimed in claim 12, further comprising at least:

a network management system.

* * * * *